United States Patent [19]
Jacquet et al.

[11] Patent Number: 4,465,124
[45] Date of Patent: Aug. 14, 1984

[54] CASING FOR A HEAT EXCHANGER IN A HEATER OR AIR CONDITIONER INSTALLATION FOR A MOTOR VEHICLE

[75] Inventors: Maurice Jacquet; Jacques Boidet, both of Maurepas, France

[73] Assignee: Valeo, Paris, France

[21] Appl. No.: 384,432

[22] Filed: Jun. 2, 1982

[30] Foreign Application Priority Data

Jun. 12, 1981 [FR] France ................................ 81 11654

[51] Int. Cl.³ .............................................. F28F 9/00
[52] U.S. Cl. ...................................... 165/67; 165/78; 165/149
[58] Field of Search ................... 165/149, 78, 67, 69, 165/72-76

[56] References Cited

U.S. PATENT DOCUMENTS

| | | | |
|---|---|---|---|
| 2,506,051 | 5/1950 | Young | 165/67 |
| 3,858,291 | 1/1975 | Perpall | 165/69 X |
| 3,894,580 | 7/1975 | Chartet | 165/149 X |
| 4,328,859 | 5/1982 | Bouvot | 165/149 X |

FOREIGN PATENT DOCUMENTS

| | | |
|---|---|---|
| 2035947 | 2/1971 | Fed. Rep. of Germany . |
| 2703528 | 8/1978 | Fed. Rep. of Germany . |
| 2148346 | 3/1973 | France . |
| 2259344 | 8/1975 | France . |
| 2458379 | 1/1981 | France . |
| 2465986 | 3/1981 | France . |
| 2505475 | 11/1982 | France ................................ 165/67 |
| 1486805 | 9/1977 | United Kingdom ................. 165/149 |

*Primary Examiner*—Sheldon J. Richter
*Attorney, Agent, or Firm*—Dennison, Meserole, Pollack & Scheiner

[57] ABSTRACT

A casing (10) for receiving a heat exchanger (12) such as a heater or an air conditioner for a motor vehicle, has an opening surrounded by a rim (13). The heat exchanger is inserted into the casing via the opening. To fasten the heat exchanger therein, resilient lugs (18) having inwardly turned latches (21) project longitudinally from the rim. The lugs snap fasten onto a peripheral flange (16) around the water box (17) of the heat exchanger. Assembly is simplified and speeded by the arrangement, thereby reducing its cost.

10 Claims, 4 Drawing Figures

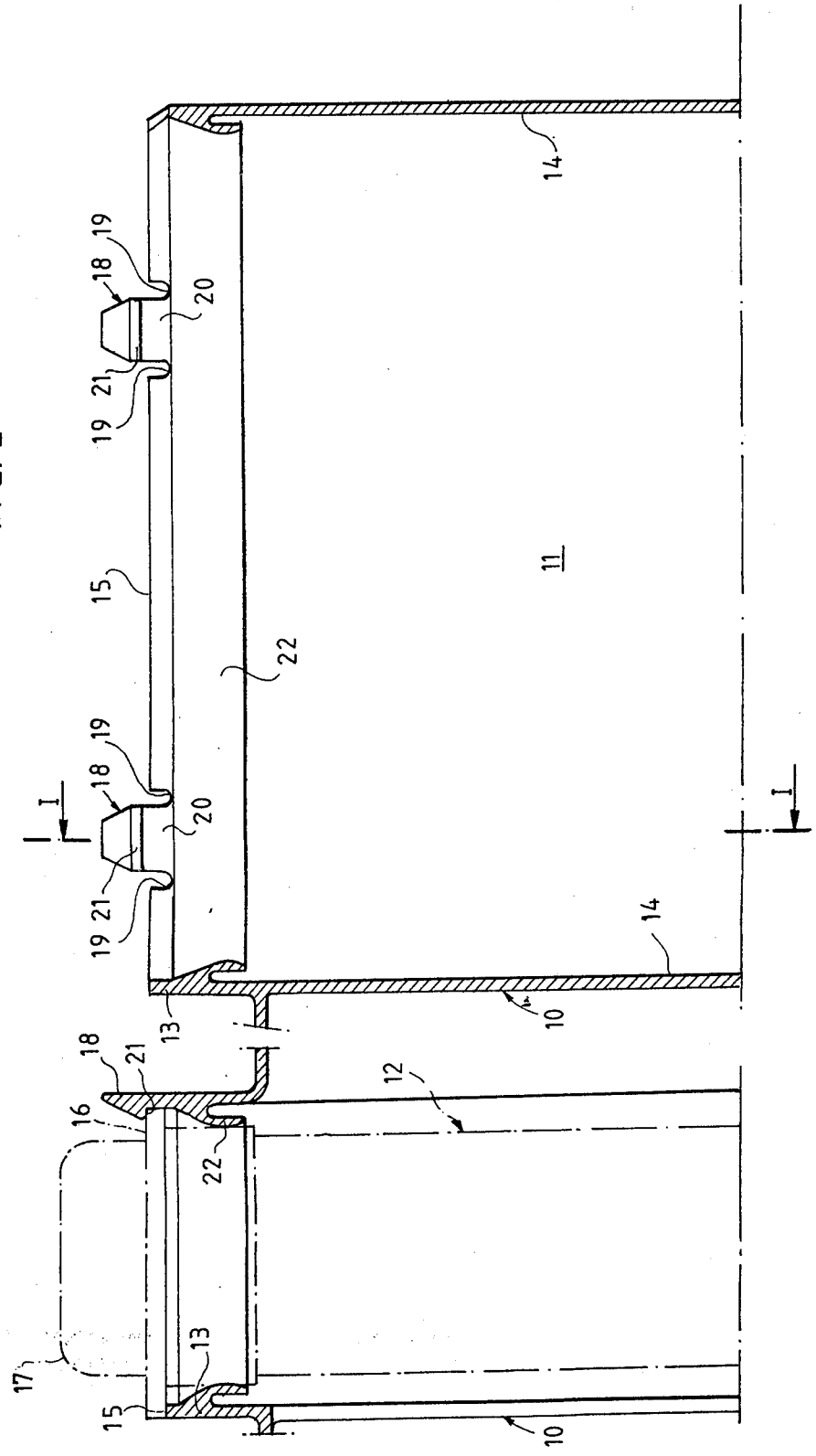

CASING FOR A HEAT EXCHANGER IN A HEATER OR AIR CONDITIONER INSTALLATION FOR A MOTOR VEHICLE

A casing for a heat exchanger in a heater or air conditioner installation for a motor vehicle.

The present invention relates to means for fixing a heat exchanger in a casing which may, for example, constitute a part of a heater or an air conditioner installation for the passenger space or cabin of a motor vehicle. The invention also relates to such a casing.

BACKGROUND OF THE INVENTION

Generally, such a casing provides a housing which is open at at least one end into which the bundle of tubes constituting the heat exchanger can be slid like a drawer. The casing also provides ducting running across the housing for the heat exchanger such that air flowing in said ducting passes through the heat exchanger bundle to be heated or cooled therein.

Up to the present, heat exchangers have been fixed in their casings by suitable auxiliary means, e.g. by screws, cooperating with lugs projecting from a heat exchanger's water box and having holes through which screws or other suitable fasteners are passed. Such assembly is a lengthy, and hence expensive, operation.

Proposals have also been made to fix a heat exchanger in its housing by means of lugs which depend from its water box and which act as spring clips. However, in this case the lugs are fragile and are dangerously exposed until the heat exchanger has been fixed in its casing.

Preferred embodiments of the present invention simplify and facilitate fixing a heat exchanger in its housing in the casing. This is done at reduced cost and avoiding the drawbacks of the prior art.

SUMMARY OF THE INVENTION

The present invention provides means for fixing a heat exchanger in a casing, said casing constituting a part of a heater or an air conditioner installation for a motor vehicle, for example, wherein the casing delimits a housing which has an opening at at least one end via which opening the heat exchanger is inserted into the casing, and wherein said opening is surrounded by a rim from which there project resiliently deformable lugs suitable for co-operating with a portion of an end of the heat exchanger to clip fasten the heat exchanger in the housing.

Thus, in accordance with the invention, the heat exchanger merely needs to be inserted into its housing and correctly positioned therein to ensure that fixed therein by clip fastening.

Preferably, the end of the rim surrounding the opening of the housing constitutes a stop which abuts against a peripheral flange disposed around the water box of the heat exchanger.

The stop and flange ensure correct positioning of the heat exchanger in the housing simultaneously with it being fixed therein by clip fastening.

BRIEF DESCRIPTION OF THE DRAWINGS

Two embodiments of the invention are described by way of example with reference to the accompanying drawings, in which:

FIG. 1 is a cross section along a line I—I of FIG. 2 through a portion of a heat exchanger casing and showing fixing means in accordance with the invention;

FIG. 2 is a longitudinal section through a portion of the casing shown in FIG. 1;

MORE DETAILED DESCRIPTION

Figure 3:
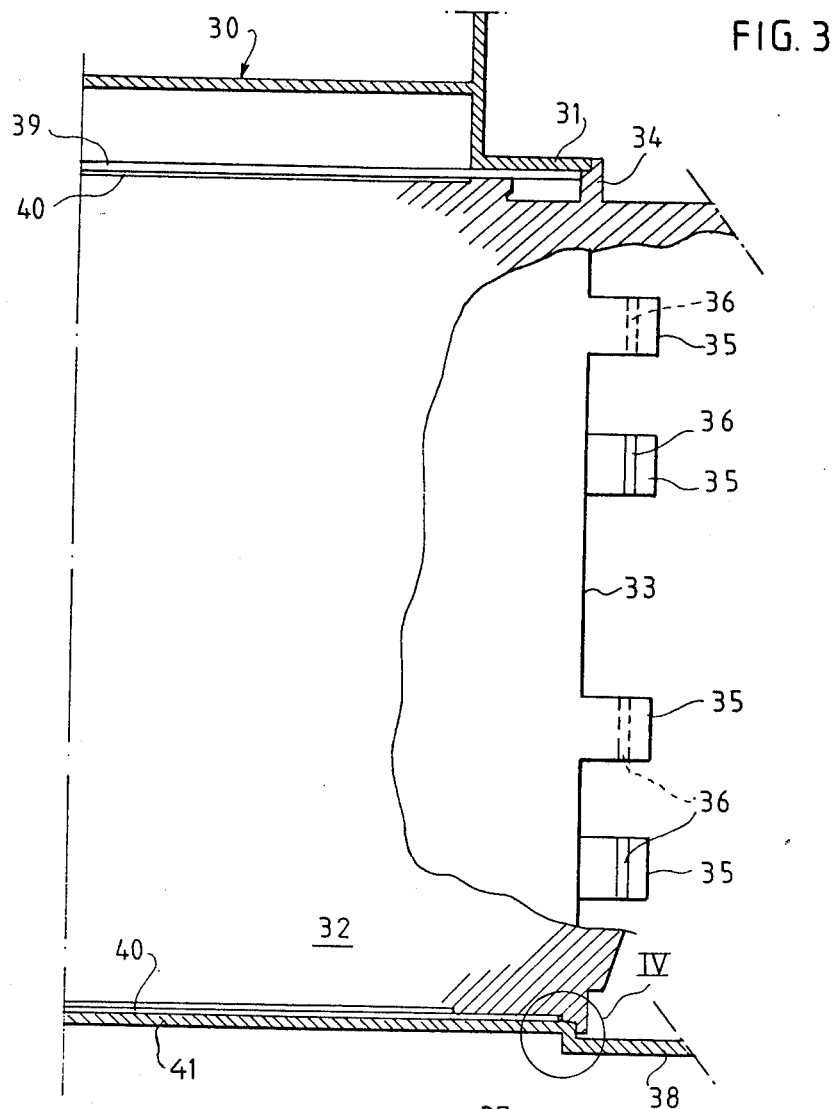
FIG. 3 is a longitudinal section through a second casing.

Reference is made initially to FIGS. 1 and 2, which show a portion of a casing 10 of a heater or air conditioner installation for the passenger space or cabin of a motor vehicle. The casing 10 is made of moulded plastic, and delimits a housing 11 for receiving a heat exchanger 12 indicated by a chain dotted line in FIG. 1. At least one longitudinal end of the housing 11 is open and is delimited by a rim 13 which lies substantially in the same plane as the wall 14 of the housing 11. The end 15 of the rim 13 is straight and constitutes a positioning stop for a peripheral flange 16 running round the water box 17 of the heat exchanger 12.

The rim 13 also has clip lugs 18 projecting out from the casing substantially in the same plane as the wall 14 of the housing 11. The lugs 18 are resiliently deformable. To facilitate their resilient movement outwardly while a heat exchanger is being inserted into the housing, the lugs 18 have notches 19 disposed on either side of them in the rim 13, thereby defining portions 20 of rim 13 whose dimensions are chosen so as to ensure that the lugs 18 are as flexible as required.

Each lug 18 has a latch on its face directed towards the opening of the housing 11. The latches 21 are suitable for engaging the opposite face of the flange 16 to that which engages the end of the rim 13, i.e. the top face as shown in FIG. 1. In each position where it is to be latched to one of the lugs 18, the flange 16 has a notch or cut out matching the thickness of the lugs 18 just below their latches 21.

Thus, when the heat exchanger is inserted into the housing 11, it is pushed into the housing until the peripheral flange 16 on the water box 17 abuts against the end 15 of the rim 13 around the opening to the housing 11. During this movement, the lugs 18 are pushed outwardly as the flange 16 comes into contact with the sloping portion of the latches 21, then, once the flange 16 abuts against the end 15 of the rim 13, the latches 21 snap into position over the opposite face of the flange 16. The heat exchanger is thus fixed in the housing 11 as shown in FIG. 1.

In the embodiment shown in the drawing, the housing is of substantially rectangular cross section, and the clip fastening lugs 18 project from the two longer sides of the rim 13 surrounding the opening to the housing 11. The shorter sides of the rim 13 are not fitted with lugs 18. Along the two longer sides, the lugs on one side may be staggered relative to the lugs on the other side.

In addition to being held fast against movement in the insertion direction by the flange 16 abutting against the end 15 of the rim 13 and by the latches 21 snapping over the opposite side of the flange, the heat exchanger 12 is held fast against movement in a direction transversal thereto by a resiliently deformable lip 22 depending inwardly from the rim 13. Said lip is suitable for providing a seal around the heat exchanger, e.g. by pressing against the walls surrounding the perforated plate associated with the water box 17. This avoids air leaking out through the opening to the housing 11 via which the heat exchanger is inserted during assembly.

Figure 4:
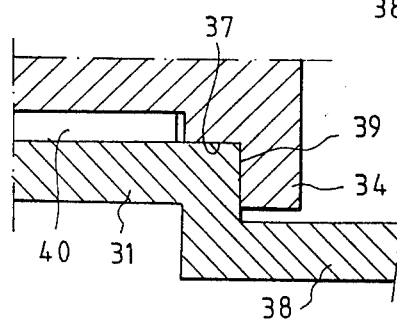
FIG. 4 is a view on a larger scale of a detail of FIG. 3 highlighted by a circle IV.

Reference is now made to FIGS. 3 and 4, which show a varient casing.

In these figures, the casing referenced 30 has an open end delimited by a rim 31 and via which a heat exchanger 32 is inserted into its housing.

As in the preceding embodiment, the end 33 of the rim 31 abuts against a peripheral flange 34 around some part of the heat exchanger, e.g. its water box.

Projecting from the longer sides of the rim 31, there are resiliently deformable tabs 35 with latches 36 turned towards the opening in the casing. As indicated above, the clip fastening tabs 35 project from the longer sides of the rim 31 in a staggered arrangement between sides.

The end 33 of the rim 31 is substantially sealed to a matching joggle 37 in the peripheral flange 34 around the heat exchanger. As shown at 38, some portions of the rim 31 extend beyond the end 33, and have a shoulder 39 which co-operates with the joggle 37. This provides a labyrinth seal to prevent air from escaping from the opening via which the heat exchanger is inserted into its housing.

The walls 41 constituting the smaller longitudinal sides of the heat exchanger housing have longitudinal ribs 40 projecting into the housing to press against the longitudinal sides of the bundle of tubes in the heat exchanger to provide sealing. This ensures that the air flowing through the casing has to pass through the bundle of heat exchanger tubes and cannot flow round the tubes.

We claim:

1. A method for mounting a heat exchanger in a casing comprising:
   providing a casing comprising a housing defining an opening in at least one end thereof, via which opening the heat exchanger is inserted into the casing, a rim surrounding the opening, and at least two resiliently deformable lugs projecting from the rim, suitable for cooperating with a portion of an end of the heat exchanger;
   slidably inserting said heat exchanger into said casing via the opening in a manner so as to push said resiliently deformable lugs outwardly;
   allowing said lugs to resiliently return toward their original position in order to clip fasten said heat exchanger in said housing.

2. The method according to claim 1, wherein the casing additionally comprises a resiliently deformable lip projecting inwardly from the rim to form a seal around the outside wall of the heat exchanger.

3. A casing adapted to receive a heat exchanger, said casing constituting a part of a heater or an air conditioner installation for a motor vehicle, comprising:
   a housing defining an opening in at least one end thereof, via which opening the heat exchanger is inserted into the casing;
   a rim surrounding the opening;
   at least two resiliently deformable lugs projecting from the rim, suitable for cooperating with a portion of an end of the heat exchanger in order to clip fasten the heat exchanger in the housing;
   a resiliently deformable lip projecting inwardly from the rim to form a seal around an outside wall of the heat exchanger.

4. A casing according to claim 3, wherein the lugs extend substantially in the same plane as the corresponding wall of the heat exchanger housing, and have latches facing towards the opening.

5. A casing according to claim 3, wherein the opening is substantially rectangular, with the lugs projecting from two opposite sides of the rim around the opening.

6. A casing according to claim 5, wherein the lugs are in a staggered disposition along said opposite sides.

7. A casing according to claim 3, wherein notches are formed in the rim on either side of the lugs.

8. A casing according to claim 3, wherein the heat exchanger has an end which is surrounded by a peripheral flange, and wherein the end of the rim around said opening abuts against said peripheral flange.

9. A casing according to claim 8, wherein the peripheral flange around the heat exchanger has notches to receive the clip fastening lugs.

10. A casing according to claim 8, wherein the peripheral flange around the heat exchanger includes a joggle which receives the end of the rim around the opening, to form a labyrinth seal therewith.

* * * * *